United States Patent [19]

Bartholomeusz

[11] Patent Number: 5,696,747
[45] Date of Patent: *Dec. 9, 1997

[54] SYSTEM AND METHOD FOR HIGH RESOLUTION OPTICAL RECORDING USING DUAL OPTICAL SOURCES AND AN INDUCED SHIFT IN MEDIA ABSORPTION

[75] Inventor: Brian Josef Bartholomeusz, Pittsford, N.Y.

[73] Assignee: Eastman Kodak Company, Rochester, N.Y.

[*] Notice: The term of this patent shall not extend beyond the expiration date of Pat. No. 5,477,520.

[21] Appl. No.: 660,830

[22] Filed: Jun. 10, 1996

Related U.S. Application Data

[63] Continuation-in-part of Ser. No. 297,063, Aug. 26, 1994, abandoned.

[51] Int. Cl.$^6$ ....................................................... G11B 7/00
[52] U.S. Cl. ........................ 369/100; 369/44.37; 369/288; 369/284; 369/125; 430/495
[58] Field of Search ............................ 369/284, 286, 369/100, 44.37, 102, 125, 107, 116, 109, 54, 110, 288; 430/495; 428/64

[56] References Cited

U.S. PATENT DOCUMENTS

| | | | |
|---|---|---|---|
| 4,360,908 | 11/1982 | Howe et al. | 369/109 |
| 4,502,762 | 3/1985 | Anderson | 350/394 |
| 4,530,080 | 7/1985 | Aoi et al. | 369/44.38 |
| 4,556,964 | 12/1985 | Trethewey | 369/44 |
| 4,571,716 | 2/1986 | Szerlip | 369/54 |
| 4,694,447 | 9/1987 | Cohen et al. | 369/110 |
| 4,718,053 | 1/1988 | Sato et al. | 369/44 |
| 4,841,514 | 6/1989 | Tsuboi et al. | 369/100 |
| 4,963,464 | 10/1990 | Setani | 430/495 |
| 5,219,823 | 6/1993 | Chapman | 503/227 |
| 5,248,538 | 9/1993 | Kovacs et al. | 428/64 |
| 5,272,047 | 12/1993 | Kovacs et al. | 430/495 |
| 5,477,520 | 12/1995 | Bartholomeusz | 369/120 |

OTHER PUBLICATIONS

William P. Risk, Compact blue laser devices, Optics & Photonics News, May 1990.
Steven M. Jarrett, Performance Characteristics of Compact, Air–Cooled, Ion Lasers, SPIE, vol. 898 Miniature Optics and Lasers, 1988, pp. 76–79.
Haase et al, Blue–green laser diodes, Appl. Phys. Lett. 59 (11), Sep. 9, 1991, pp. 1272–1274.
Koziovsky et al, Generation of 41 mW of blue radiation by frequency doubling of a GaAlAs diode laser, Appl. Phys. Lett. 56 (23), Jun. 4, 1990, pp. 2291–2292.
Oka et al, A Triple–Density Optical Disk System Using a Frequency–Doubled Nd:YAG Laser, SPIE vol. 1139 Optical Storage and Scanning Technology, 1989, pp. 149–154.

*Primary Examiner*—David C. Nelms
*Assistant Examiner*—Kim-Kwok Chu
*Attorney, Agent, or Firm*—Raymond L. Owens

[57] ABSTRACT

A system and method for recording data on an optical recording medium. One system in accordance with the invention includes an optical recording medium which absorbs less radiation at a first wavelength than at a second wavelength; a first optical source to generate a first radiation beam at the first wavelength; a second optical source to generate a second radiation beam at the second wavelength; and means for applying the first radiation beam and the second radiation beam, at least one of which is modulated by recording data, to the recording medium. The second radiation beam, which may have a shorter wavelength than the first radiation beam, induces a shift in the absorption response of a region of the medium. The region then absorbs an increased amount of radiation at the first wavelength such that a high resolution mark may be formed on the medium.

20 Claims, 2 Drawing Sheets

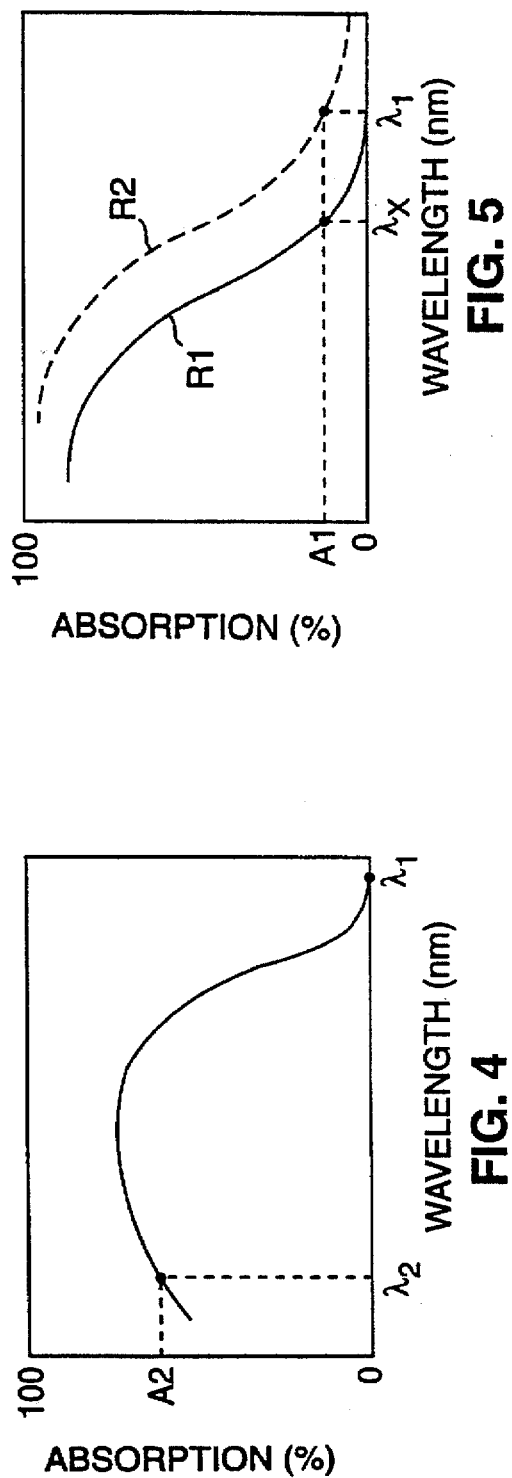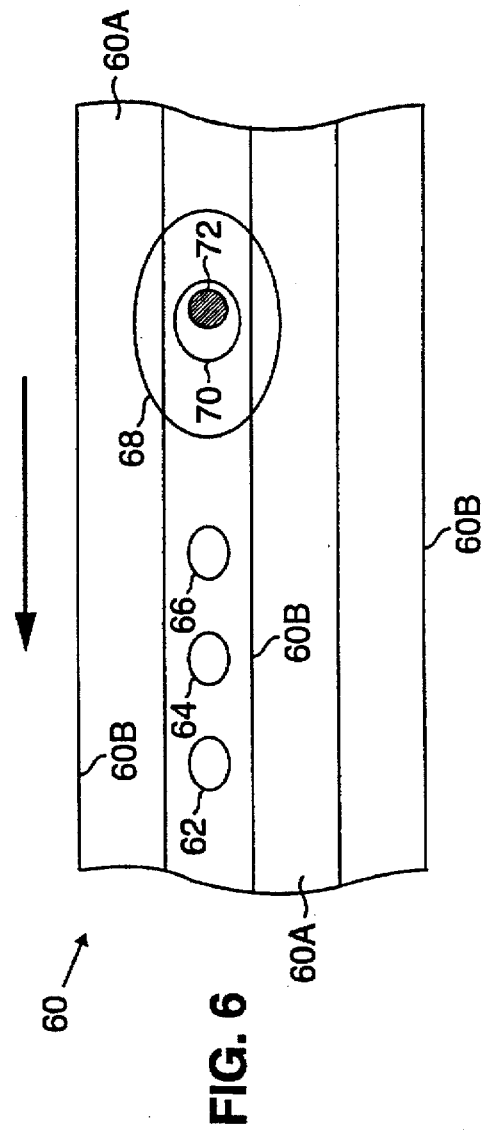

SYSTEM AND METHOD FOR HIGH RESOLUTION OPTICAL RECORDING USING DUAL OPTICAL SOURCES AND AN INDUCED SHIFT IN MEDIA ABSORPTION

CROSS-REFERENCE TO RELATED APPLICATIONS

This application is a continuation-in-part of U.S. patent application Ser. No. 08/297,063, filed Aug. 26, 1994, now abandoned on Sep. 12, 1996.

FIELD OF THE INVENTION

The present invention relates generally to optical data recording. More particularly, the present invention relates to an improved optical recording system which utilizes an induced shift in media absorption to record data on an optical recording medium.

DESCRIPTION OF THE PRIOR ART

A known technique for improving optical recording resolution involves the use of short-wavelength optical sources, which presently include sources operating in the blue and green portions of the optical spectrum. For example, a short-wavelength optical source typically produces a smaller focused illumination spot on a recording medium, and could thereby permit substantially increased optical storage densities. Unfortunately, many currently available short-wavelength sources are unsuitable for use in optical recording applications. One significant problem is that these sources often have a low output power which, although usually acceptable for readout applications, is generally insufficient to record data on an optical medium in a single-source optical recording system. This problem is particularly significant at high recording data rates.

FIG. 1 shows an exemplary optical recording system 10 in accordance with the prior art. A data source 12 supplies a stream of recording data to a first optical source 14, which is typically a laser diode, and may operate, for example, in the near infra-red region of the optical spectrum. The recording data directly modulates a radiation beam generated at a wavelength $\lambda_1$ by the optical source 14. The radiation beam produced by optical source 14, also referred to as an optical recording signal or a write beam, is collimated by collimating lens 16. The collimated radiation beam is transmitted through a polarization beam splitter 18 and applied to a quarter-wave plate 20. The polarization beam splitter 18 transmits a linear polarization of the radiation beam, such as a p-polarization, and quarter-wave plate 20 provides a circular polarization to the linearly polarized radiation beam. The circularly polarized radiation beam from quarter-wave plate 20 is focused by an objective lens 22 onto one of a number of data tracks 24B generally arranged in a spiral or in concentric circles on a data storage surface 24A of a recording medium 24. A portion of medium 24 is shown in a side cross-sectional view in FIG. 1. The radiation beam records data on data tracks 24B in the form of marks, as is well-known in the art. The recording medium 24 may be, for example, any optical disc having a surface which interacts with an incident radiation beam.

The interaction with recording medium surface 24A causes the incident radiation beam to be reflected and diffracted therefrom. The resulting radiation beam, referred to herein as a return beam, is collimated by objective lens 22 and then passes through the quarter-wave plate 20. The quarter-wave plate 20 converts the circularly polarized return beam to a linearly s-polarized return beam. The linear s-polarization is perpendicular to the linear p-polarization of the radiation beam transmitted from polarization beam Splitter 18. When the s-polarized return beam is applied to the polarization beam splitter 18, it is reflected by a surface 19 of the beam splitter 18. The surface 19 may be, for example, a multilayer coating which transmits p-polarized light and reflects s-polarized light. A detector focusing lens 26 converges the return beam onto a detector array 28 which generally includes a number of detectors for detecting the return beam. Signals from the detectors in detector array 28 may be combined to generate focus and tracking error signals, and a data signal, in a manner well-known in the art. The focus and tracking error signals may be used to control an actuator 32 which alters the position of objective lens 22 in order to maintain the radiation beam in-focus and on-track, respectively, relative to the optical recording medium 24. The data signal is indicative of data recorded on the data track 24B scanned by the radiation beam. The portion of the optical system 10 which generates and processes the radiation beam is commonly referred to as an optical head. As noted above, optical source 14 is often not a short-wavelength optical source. This is due in part to the fact that many short-wavelength optical sources provide insufficient output power to record data in system 10.

One possible approach for improving the recording resolution of an optical system without using a short-wavelength optical source involves using a tip of a Gaussian illumination spot produced by a longer wavelength source, such as optical source 14, to record high resolution marks. FIG. 2 is a graph of data signal level, indicative of the extent of mark formation, as a function of write beam power level for an exemplary optical recording medium. The graph shown is typical of the mark formation response of thresholding recording media, which include, for example, dye and dye-polymer media, phase-change media, and ablative media. $P_C$ represents a write power level which may be used in a conventional recording technique, in which the minimum mark size is typically on the order of the spot diameter. In order to produce high resolution marks using Gaussian tip writing, the write beam power level would generally be set close to the mark formation threshold $P_{TH}$, for example, at a lower power level $P_L$ between $P_{TH}$ and $P_C$. However, operating so close to the mark formation threshold would typically result in non-uniform and poorly controlled recording. Slight changes in write beam focus, tracking, or power level could result in substantial changes in mark size and quality. A Gaussian tip writing technique therefore generally cannot provide the performance improvements possible with a short-wavelength optical source.

Several prior art optical systems attempt to overcome the low output power problem, and thereby obtain the advantages of a short-wavelength optical source, by using two optical sources. U.S. Pat. No. 4,530,080 discloses a dual source optical recording system which uses a first and second laser beam. One beam is produced by an LED source, and preheats the recording medium. The other beam is produced by a shorter wavelength source, and the sum of the power levels of the first and second beams is sufficient to record data. Another prior art dual optical source recording system is disclosed in U.S. Pat. No. 4,841,514. This system uses two light spots at different wavelengths to facilitate high-speed recording on an erasable phase-change medium. The source providing the first spot serves to preheat the recording medium in order to reduce the amount of time required for the second spot, which generally has a shorter wavelength and is modulated by recording data, to mark the medium. These and other prior art dual source optical systems, however, generally provide only limited resolution improvements. In addition, the above prior art systems may be useful with only certain types of optical media which initially absorb radiation at both source wavelengths.

As is apparent from the above, a need exists for an optical recording system which more fully utilizes the advantages of short-wavelength optical sources to provide improved resolution in optical recording on a variety of different media.

SUMMARY OF THE INVENTION

The present invention provides a system and method for optical data recording which uses one radiation beam to illuminate a region of an optical recording medium and induce a shift in the absorption response of the region. The region is thereby locally sensitized to another radiation beam, which has a different wavelength, such that the region absorbs an increased amount of radiation at the different wavelength.

In accordance with one aspect of the present invention, an optical recording system is provided which includes an optical recording medium having an absorption response such that the medium absorbs less radiation at a first wavelength than at a second wavelength; a first optical source to generate a first radiation beam at the first wavelength; a second optical source to generate a second radiation beam at the second wavelength; and means for applying the first radiation beam and the second radiation beam, at least one of which is modulated by recording data, to the recording medium. The second radiation beam induces a shift in the absorption response of a region of the medium. The region is thereby sensitized to the first radiation beam and absorbs an increased amount of radiation at the first wavelength, such that a high resolution mark may be formed therein. In a preferred embodiment, the second beam has a shorter wavelength than the first beam, is directly or indirectly modulated by the recording data, and produces a second illumination spot located within a first illumination spot produced on the medium by the first radiation beam. A high resolution mark smaller than the second illumination spot can then be formed on the medium.

In accordance with another aspect of the present invention, a method of recording data on an optical recording medium is provided. The exemplary method includes the steps of providing an optical recording medium having an absorption response such that the medium absorbs less radiation at a first wavelength than at a second wavelength; generating a first radiation beam at the first wavelength; generating a second radiation beam at the second wavelength; modulating at least one of the first and the second radiation beams with recording data to be recorded on the recording medium; applying the first and the second radiation beams to the optical recording medium; and inducing a shift in the absorption response of the medium in a region illuminated by the second radiation beam such that in that region the medium absorbs an increased amount of radiation at the first wavelength.

A short-wavelength source used in accordance with the present invention need not operate at a high power level. The present invention thus permits use of many different types of short-wavelength sources to form high resolution marks on an optical recording medium. Also, the present invention provides significantly improved recording resolution relative to prior art dual source optical systems, thereby permitting increased optical storage densities. In addition, the present invention can be utilized with a number of different recording media which would not otherwise absorb sufficient radiation to form a mark at either a short wavelength or a longer wavelength.

Further features of the invention, its nature and various advantages will become more apparent from the accompanying drawings and the following detailed description of the invention.

BRIEF DESCRIPTION OF THE DRAWINGS

FIG. 4 is a graph of absorption as a function of incident beam wavelength for an exemplary optical recording medium suitable for use in conjunction with the present invention.

FIG. 5 is a graph of absorption as a function of incident beam wavelength for an exemplary illuminated region of an optical recording medium, illustrating an induced shift in the medium absorption response in that region in accordance with the present invention.

FIG. 6 shows a portion of an optical recording medium having a data track on which several marks are formed in accordance with the present invention.

DETAILED DESCRIPTION OF THE PREFERRED EMBODIMENTS

Figure 3:
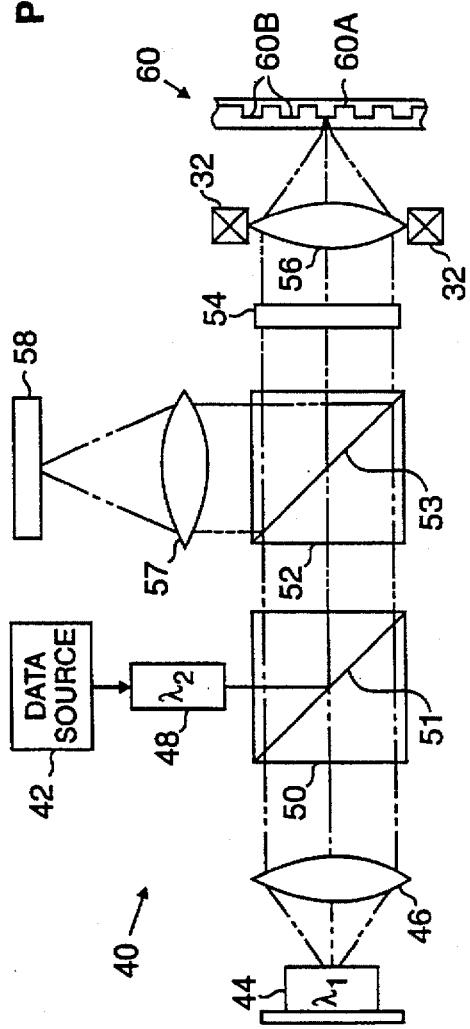
FIG. 3 shows an exemplary optical recording system in accordance with the present invention with a first unmodulated optical source and a second modulated short-wavelength optical source.

FIG. 3 illustrates an exemplary dual source optical recording system 40 in accordance with the present invention. A recording system, as the term is used herein, may include an optical system, such as system 40, which can read as well as record data. The system 40 is shown for purposes of illustration only, and should not be construed as limiting the present invention to use with only the type of recording system shown. For example, other optical systems could include alternative arrangements of optical components such as reflectors, lenses, beam splitters and prisms for directing and processing the radiation beams. In addition, the present invention could be used in, for example, parallel recording systems, such as digital optical tape systems. Furthermore, although the present invention is particularly well-suited for use in optical recording systems, it may also provide advantages in other optical applications, including, for example, laser printing.

The system 40 includes a data source 42, a first optical source 44, a collimating lens 46, a second optical source 48 and an optical signal combiner 50 with a surface 51. The first optical source 44 produces a first radiation beam at a first wavelength $\lambda_1$. In one group of embodiments, the first wavelength $\lambda_1$ of the first optical source is greater than about 600 nanometers. The first optical source 44 may be, for example, a GaAlAs laser diode or other near-infrared laser diode, or a near-infrared light-emitting diode (LED). These types of sources are generally inexpensive and can provide an output power on the order of 20 mW or more. The near-infrared portion of the optical spectrum includes wavelengths of about 770 to 1400 nanometers. Alternatively, the first optical source 44 may be another type of laser diode or LED, or a laser, and may provide an output at any of a number of other wavelengths in the optical spectrum. The first radiation beam is collimated by collimating lens 46 and applied to optical signal combiner 50.

The second optical source 48 is directly modulated by data source 42 and generates a modulated second radiation beam at a second wavelength $\lambda_2$. The second wavelength $\lambda_2$ is shorter than the first wavelength $\lambda_1$ of the first radiation beam from first optical source 44, and source 48 is therefore referred to herein as a short-wavelength source. Although the second wavelength $\lambda_2$ is less than about 600 nanometers in one group of embodiments, higher wavelengths could be used in other embodiments. The short-wavelength optical source 48 may provide an output in, for example, the blue or green portion of the optical spectrum, and may be, for example, a gas laser, a laser diode, a frequency-doubled laser diode, a frequency-doubled Nd/host laser or any other type of optical source operating at a wavelength below that of the first optical source 44. Many of these short-wavelength sources are low power optical sources, and are therefore generally not suitable for use in generating a write beam in a single-source optical recording system. Short-wavelength sources are described in more detail in, for example, W. P. Risk, "Compact blue laser devices", Optics and Photonics News, pp. 10–15, May 1990; S. M. Jarrett, "Performance Characteristics of Compact, Air-cooled Ion Lasers", Proc. SPIE, Vol. 898, Miniature Optics and Lasers, pp. 76–79, 1988; M. A. Haase et al., "Blue-green laser diodes", Applied Physics Letters, Vol. 59, No. 11, pp. 1272–1274, September 1991; W. J. Kozlovsky et al., "Generation of 41 mW of blue radiation by frequency doubling of a GaAlAs diode laser", Applied Physics Letters, Vol. 56, No. 23, pp. 2291–2292, June 1990; and M. Oka et al., "A Triple-Density Optical Disk System Using a Frequency-Doubled Nd:YAG Laser", Proc. SPIE, Vol. 1139, Optical Storage and Scanning Technology, pp. 149–154, 1989. The above-cited articles are incorporated herein by reference.

The second radiation beam is also applied to optical signal combiner 50. The optical signal combiner 50 is arranged between the first source 44 and the second source 48 to receive and combine the first and second radiation beams, and may be, for example, a dichroic beam splitter. Alternative optical signal combiners suitable for use with the present invention include, for example, polarization beam splitters, dichroic plates and wavelength separation filters. The design and operation of these exemplary optical signal combiners are well-known and need not be further described herein, Although the beam produced by second optical source 48 generally has a power level insufficient to mark the recording medium, the combined beam is capable of performing high resolution marking in a manner to be described below.

The optical signal combiner 50 directs the combined radiation beam to polarization beam splitter 52 which transmits a linear polarization of both the first and second beams. The quarter-wave plate 54 provides a circular polarization to the combined beam. A lens 56 is arranged between the quarter-wave plate 54 and an optical recording medium 60 to converge the combined beam onto a data track 60B of medium 60. Lens 56 may be an objective lens or any other type of lens suitable for focusing the combined beam onto the medium. As will be discussed in greater detail below, the combined beam is used to form marks on the data tracks 60B of medium 60. The combined radiation beam of the present invention allows higher resolution marks to be formed with greater control and accuracy than is possible in prior art systems.

Figure 2:
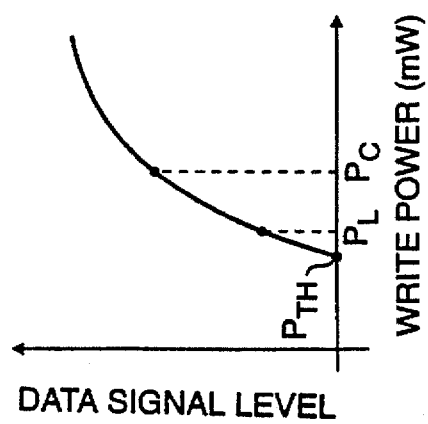
FIG. 2 is a graph of data signal level as a function of write beam power level, illustrating the mark formation sensitivity of single-source Gaussian tip recording in accordance with the prior art.
Figure 1:
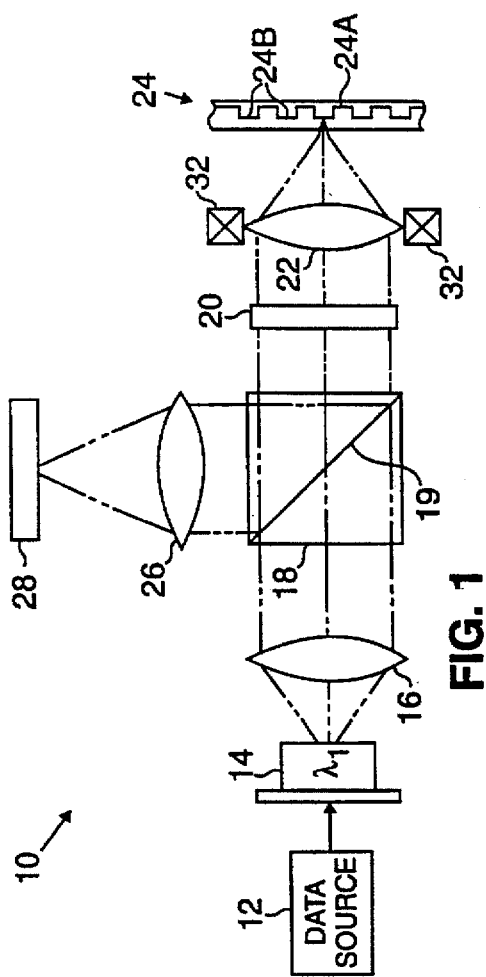
FIG. 1 shows an exemplary optical system in accordance with the prior art.

A return beam resulting from application of the combined beam to the medium 54 is directed and processed by lens 56, quarter-wave plate 54, polarization beam splitter 52, as well as a detector focusing lens 57 and a detector array 58, in a manner similar to that described above in conjunction with FIG. 1. The quarter-wave plate 54 may be a combination waveplate which provides a given retardance at two or more different wavelengths, or a harmonic waveplate which provides a given retardance at different harmonic wavelengths. Those skilled in the art can readily determine appropriate parameters for the components shown in FIG. 3 in order to accommodate a combined beam in accordance with the present invention.

In one embodiment of the present invention, the first beam is continually generated by first optical source 44 at a substantially constant power level during data recording. The second beam produced by second optical source 48 is modulated in accordance with the recording data from data source 42. It should be understood that the connection of data source 12 to second optical source 48 in FIG. 3 is exemplary only. In alternative embodiments, the first radiation beam could be modulated by the recording data, or both the first and the second radiation beams could be modulated by the data. In addition, the first and/or second optical sources could be directly modulated by data source 42 to provide the modulated first and/or second radiation beams, or an optical modulator (not shown) could be connected to data source 42 and placed in the path of the first beam and/or the second beam to indirectly provide the modulation.

The second radiation beam from second source 48 may also be used to detect data and generate focus and tracking error signals in a manner well-known in the art. Because the second radiation beam has a smaller illumination spot size, it provides improved readout performance relative to the longer wavelength beam produced by the first optical source 44. The present invention may thus be implemented in an optical system which includes both reading and recording capabilities.

The return beam resulting from application of the combined beam to the medium 24 includes both a first beam portion and a second beam portion. The second beam portion, resulting from application of the second radiation beam to the medium, may be separated from the first beam portion, resulting from the application of the first beam to the medium, and separately processed such that only the second beam is used to provide focus error, tracking error and data signals in system 40. For example, the quarter-wave plate 54 may be replaced by a combination waveplate which provides 90° of retardance at the short wavelength $\lambda_2$ and 180° of retardance at the longer wavelength $\lambda_1$, such that only the second beam portion of the return beam is reflected by a surface 53 of polarization beam splitter 52 toward detector array 58. Alternatively, polarization beam splitter 52 could be a dichroic beam splitter which reflects only the second beam portion of the return beam toward detector array 58. Another alternative could involve placing a filter (not shown) in the path of the return beam, such that only the second beam portion thereof is passed to the detector array 58. Such a filter could be placed, for example, before or after the focusing lens 57. As another alternative, lens 57 could be provided with a different focal length at the first and second wavelengths, such that only the second beam portion of the return beam is focused on the detector array.

Although in the system of FIG. 3 the first and second radiation beams are combined prior to their application to the medium, in other embodiments the two beams could be applied to the medium via separate optical paths. Alternative means for applying the first and second radiation beams to the medium thus include any arrangement of optical components which direct the first and second beams onto the surface of the medium. The beam combiner 50 and lens 56 in FIG. 3 are one exemplary means of applying the beams to the medium.

FIG. 4 is a graph of absorption as a function of incident radiation beam wavelength, representing an absorption response, for an exemplary optical recording medium in accordance with the present invention. An absorption response generally indicates the percentage of incident radiation absorbed by a given medium over a range of wavelengths. The response of FIG. 4 indicates that in a single-source system the given medium would absorb A2 percent of the incident radiation at the wavelength $\lambda_2$ of the second radiation beam. At the wavelength $\lambda_1$ of the first radiation beam, the medium absorbs little or no radiation in a single-source system. This absorption response indicates that the entire medium is generally insensitive to a single radiation beam at the first wavelength $\lambda_1$. In accordance with the present invention, radiation absorbed from the second radiation beam by the medium is used to induce a shift in the absorption response in a small region of the medium such that the region absorbs an increased amount of radiation at the first wavelength.

FIG. 5 is a graph of absorption as a function of incident radiation beam wavelength in a small region of the medium 24 before and after the second radiation beam is applied thereto, illustrating an induced shift in the medium absorption response within the illuminated region in accordance with the present invention. The response R1 corresponds to a portion of the response shown in FIG. 4, and indicates that the exemplary region of the medium absorbs little or no radiation at the first wavelength $\lambda_1$ and A1 percent of the radiation at a wavelength $\lambda_x$, prior to illumination by the second beam. The response R1 slopes from a relatively high absorption value to a relatively low absorption value within about 50 nanometers of wavelength $\lambda_1$. The response R1 is thus said to include an absorption edge in the vicinity of $\lambda_1$. An absorption edge is defined herein as a substantial change in absorption value over a given range of wavelength. A substantial change in absorption value includes a change of about ten percent or more, where the percentage refers to an actual percentage of radiation absorbed rather than a percentage of a given absorption value.

When the combined beam is applied to the medium, the second radiation beam at wavelength $\lambda_2$ is absorbed by the recording medium and raises the temperature of the region illuminated by the second beam. The heating effects of the radiation absorbed from the second radiation beam induce a shift in the absorption response of the optical medium within the region illuminated by the second radiation beam. The shifted response R2 indicates that within that region the medium is sensitized to the first radiation beam, and absorbs A1 percent of the incident radiation at the first wavelength $\lambda_1$. The response R2 thus represents the response R1 temporarily shifted in wavelength by the difference between $\lambda_1$ and $\lambda_x$. As a result of the thermally-induced shift in the absorption response, the region of the medium is sensitized to the first radiation beam, and absorbs an increased amount of radiation therefrom. This increased amount of energy causes the total energy absorbed at both the first and second wavelengths to exceed the recording threshold power $P_{TH}$ within the sensitized region, such that the medium may be marked within that region.

The absorption responses of FIGS. 4 and 5 are exemplary only. Although many embodiments will utilize a medium which absorbs substantially less radiation at first wavelength $\lambda_1$ than at second wavelength $\lambda_2$, the present invention may also provide advantages with any optical recording medium which absorbs less radiation at $\lambda_1$ than at $\lambda_2$. For example, a difference in absorption of less than ten percent, such as an absorption value of 70% at $\lambda_2$ and an absorption value of 61% at $\lambda_1$, combined with an appropriate absorption shift, may allow the output power of one of the optical sources to be reduced such that the lifetime of that source is considerably extended.

The term "substantially less" is defined herein to include an absorption at the first wavelength of at least ten percent less radiation than at the second wavelength. This percentage, and any other absorption percentage change referred to herein, refers to an actual percentage of incident radiation absorbed rather than a percentage of a given absorption value. The term "shift in absorption response" is defined herein to include any induced change in absorption response, resulting from application of the second radiation beam, which permits an increased amount of radiation to be absorbed at the first wavelength.

It should be noted that the second wavelength herein need not be shorter than the first wavelength. The present invention may therefore be used with optical media exhibiting absorption responses which are essentially the inverse of the responses shown in FIGS. 4 and 5. For example, the first wavelength, at which the medium absorbs substantially less radiation, may be the shorter wavelength. The second, longer wavelength, at which the medium absorbs more radiation in such an embodiment, is then used to cause a shift in the absorption response of a region of the medium. The region thereby absorbs an increased amount of radiation from the first, shorter wavelength sufficient to mark the medium in the region.

Optical media which may be designed to exhibit an induced shift in absorption response, and which are therefore suitable for use with the present invention, include media based on cyanine, pthalocyanine, and azo dyes, as well as media utilizing certain organometallic and inorganic materials. These and other types of suitable media are described in, for example, U.S. Pat. Nos. 5,219,823, 5,248,538 and 5,272,047, and U.S. patent application Ser. Nos. 08/011,606, 08/083,836, 08/137,331, 08/140,641 and 08/140,646, all of which are assigned to the assignee of the present invention, and incorporated by reference herein. In general, any of a number of other types of optical media could be designed and constructed by one skilled in the art to exhibit a substantially reduced absorption at a first wavelength relative to a second wavelength, and an appropriate absorption shift.

FIG. 6 shows a portion of the optical recording medium 60 and a data track 60B on which several marks are formed in accordance with the present invention.

A large arrow indicates the direction of movement of the recording medium 60 relative to the radiation beams incident thereon. Marks 62, 64 and 66 have been previously formed on the data track 60B in regions defined by an illumination spot of the second radiation beam. A first illumination spot 68 is produced by applying the first radiation beam to the recording medium 60. A second illumination spot 70 is produced by applying the second radiation beam to the medium 60. Radiation from the second radiation beam is absorbed by the medium 60 within a region 72 illuminated by the second radiation beam and induces a wavelength shift in the absorption response of the medium within that region. As a result, region 72 within the illumination spot 70 is sensitized to, and absorbs additional radiation from, the first radiation beam at the first wavelength $\lambda_1$. The increased amount of radiation is an amount sufficient for the medium to be marked within the region 72.

It should be noted that the effects of thermal cross-talk may limit the in-track and cross-track spacing of adjacent marks. In the embodiment shown in FIG. 3, in which the short-wavelength second radiation beam is modulated, high resolution marks may be formed within the illumination spot of the modulated second beam, and therefore spacing between adjacent marks can be substantially reduced. Similar resolution improvements are expected in embodiments in which both the first and second beams are modulated. In fact, modulating both beams will generally reduce thermal cross-talk and related effects that could result in energy absorption by still-warm regions of the medium during subsequent marking at adjacent locations. In an embodiment in which only a long-wavelength first beam is modulated, thermal effects may limit in-track spacing of adjacent marks. However, resolution improvements may still be obtained as a result of a decrease in both mark length and mark width. A decrease in mark width allows closer spacing of adjacent data tracks, and therefore increased storage density. Those skilled in the art will recognize that thermal cross-talk can be controlled by calculating, in a well-known manner, a minimum spacing between adjacent marks, or by using an appropriate write strategy to compensate for any systematic effects which may occur in a given embodiment.

Various techniques could be used to ensure spatial overlap of the illumination spots, including, for example, the use of optical fibers to direct the first and second beams. For example, a single-mode optical fiber (not shown) could be used to direct the combined beam between beam combiner 50 and polarization beam splitter 52, and thereby ensure that the first and second beams are co-propagating. Additional lenses (not shown) could be included to couple the combined beam in and out of the optical fiber.

In alternative embodiments of the present invention, the first and second beams making up the combined beam may be arranged such that the illumination spots produced by the first and second beams do not spatially overlap on medium 60. For example, the arrangement shown in FIG. 3 could be readily modified by one skilled in the art such that illumination spots from the first and second beams are adjacent to or slightly separated from each other on medium 60, in a substantially in-track direction, with no spatial overlap. Even small amounts of a cross-track offset, however, may result in variation in mark length and therefore may not be suitable in many applications. In an embodiment with in-track or cross-track offset, the first beam could, for example, either lead or trail the second beam. In any case, the beams should be close enough such that the combined effects of both beams result in mark formation. A combined radiation beam is therefore defined herein as any group of two or more different wavelength radiation beams, the combined effects of which are sufficient to mark an optical medium. In general, the mount of in-track or cross-track offset acceptable in a given application will depend upon factors such as radiation beam wavelengths and illumination spot sizes.

Other alternative embodiments of the present invention may use one or more additional optical sources in the recording process. For example, a third radiation beam from a third optical source could be combined with the first and second beams in order to raise the power level of the combined beam over the recording power threshold during periods of logic high level modulation. The system 40 described above could be readily modified by those skilled in the art to accommodate these and other multiple optical source embodiments.

Although the foregoing detailed description has illustrated the present invention primarily in terms of a particular optical recording system, it should be understood that the embodiments described are exemplary only. Many variations may be made in the arrangement shown, including, for example, the type of optical sources used to generate the first and second beams, the manner in which the beams are combined, the power levels and illumination spot sizes for each of the beams, the type of optical recording medium used, the degree to which the beams are spatially superimposed on the medium, and the type and arrangement of optical components used for directing and processing the beams in the optical system. These and other alternatives in variations will be readily apparent to those skilled in the art, the present invention is therefore limited only by the appended claims.

PARTS LIST

A1 absorption at first wavelength
A2 absorption at second wavelength
$\lambda_1$ first wavelength
$\lambda_2$ second wavelength
$\lambda_x$ wavelength
$P_C$ conventional write power level
$P_L$ lower write power level
$P_{TH}$ recording threshold power level
R1 unshifted absorption response
R2 shifted absorption response
10 optical recording system
12 data source
14 first optical source
16 collimating lens
18 polarization beam splitter
19 surface
20 quarter-wave plate
22 objective lens
24 recording medium
24A data storage surface
24B data tracks
26 detector focusing lens
28 detector array
32 actuator
40 optical recording system
42 data source
44 first optical source
46 collimating lens
48 second optical source
50 optical signal combiner
51 surface
52 polarization beam splitter
53 surface
54 quarter-wave plate
56 lens
57 detector focusing lens
58 detector array
60 optical recording medium 60A data storage surface
60B data tracks
62, 64, 66 marks
68 first illumination spot
70 second illumination spot
72 sensitized region

What is claimed is:

1. An optical recording system comprising:
   an optical recording medium having an absorption response such that said medium absorbs less radiation at a first wavelength than at a second wavelength;
   a first optical source to generate a first radiation beam at said first wavelength;
   a second optical source to generate a second radiation beam at said second wavelength, such that at least one of said first and said second radiation beams are modulated by recording data to be recorded on said medium; and
   means for applying said first radiation beam and said second radiation beam to said recording medium;
   wherein said second radiation beam induces a shift in said absorption response of said medium in a region illuminated by said second radiation beam such that in said region said medium absorbs an increased amount of radiation at said first wavelength.

2. The system of claim 1 wherein said second wavelength is shorter than said first wavelength.

3. The system of claim 2 wherein said first radiation beam produces a first illumination spot on said medium, and said second radiation beam produces a second illumination spot on said medium within said first illumination spot.

4. The system of claim 2 wherein a mark formed on said medium as a result of said shift is smaller than an illumination spot produced on said medium by said modulated second radiation beam.

5. The system of claim 1 wherein said first radiation beam generated by said first optical source is modulated by said recording data.

6. The system of claim 1 wherein said second radiation beam generated by said second optical source is modulated by said recording data.

7. The system of claim 1 wherein said first and said second radiation beams are modulated by said recording data.

8. The system of claim 1 wherein said absorption response of said optical recording medium includes an absorption edge within about 50 nanometers of said first wavelength.

9. The system of claim 1 wherein said medium absorbs at least ten percent less radiation at said first wavelength than at said second wavelength, prior to said shift in said absorption response.

10. The system of claim 1 wherein said means for applying said first and said second radiation beams to said medium further includes:
    an optical signal combiner arranged relative to said first optical source and said second optical source to combine said first and second radiation beams therefrom into a combined radiation beam; and
    a lens arranged between said signal combiner and said optical recording medium to direct said combined beam onto said optical recording medium.

11. The system of claim 10 further including:
    a polarization beam splitter arranged between said optical signal combiner and said lens to linearly polarize said combined radiation beam; and
    a wave plate arranged between said polarization beam splitter and said lens to circularly polarize said combined radiation beam.

12. A method of optical data recording comprising the steps of:
    providing an optical recording medium having an absorption response such that said medium absorbs less radiation at a first wavelength than at a second wavelength;
    generating a first radiation beam at said first wavelength;
    generating a second radiation beam at said second wavelength;
    modulating at least one of said first and said second radiation beams with recording data to be recorded on said recording medium;
    applying said first and said second radiation beams to said optical recording medium; and
    inducing a shift in said absorption response of said medium in a region illuminated by said second radiation beam such that in said region said medium absorbs an increased amount of radiation at said first wavelength.

13. The method of claim 12 wherein said step of generating a second radiation beam at a second wavelength includes generating said second radiation beam at a second wavelength shorter than said first wavelength.

14. The method of claim 13 further including the step of producing a first illumination spot on said medium, and a second illumination spot within the first illumination spot, by said application of said first radiation beam and said second radiation beam, respectively, to said medium, such that a mark smaller than said second illumination spot is formed on said medium.

15. The method of claim 12 wherein said step of providing an optical recording medium further includes providing an optical recording medium which absorbs at least ten percent less radiation at said first wavelength than at said second wavelength, prior to said shift in said absorption response.

16. The method of claim 12 wherein said step of modulating at least one of said first and said second radiation beams includes modulating said first radiation beam.

17. The method of claim 12 wherein said step of modulating at least one of said first and said second radiation beams further includes modulating said second radiation beam.

18. The method of claim 12 wherein said step of modulating at least one of said first and said second radiation beams further includes modulating said first and said second radiation beams.

19. The method of claim 12 wherein said step of providing an optical recording medium further includes providing a medium having an absorption edge within about 50 nanometers of said first wavelength.

20. An optical recording system comprising:
    an optical recording medium having an absorption response such that said medium absorbs substantially less radiation at a first wavelength than at a shorter second wavelength;
    a data source to provide recording data to be recorded on said optical recording medium;

a first optical source to generate a first radiation beam at said first wavelength;

a second source, connected to said data source and modulated by said recording data, to generate a modulated second radiation beam at said second wavelength;

an optical signal combiner arranged relative to said first optical source and said second optical source to combine said first and said second radiation beams therefrom into a combined radiation beam; and a lens arranged between said optical signal combiner and said medium to direct said combined radiation beam onto said medium such that said first radiation beam produces a first illumination spot on said medium and said second radiation beam produces a second illumination spot within said first illumination spot;

wherein said second radiation beam induces a shift in said absorption response of said medium in a region within said second illumination spot such that in said region said medium absorbs an increased amount of radiation at said first wavelength.

* * * * *